US006963762B2

(12) United States Patent
Kaaresoja et al.

(10) Patent No.: US 6,963,762 B2
(45) Date of Patent: Nov. 8, 2005

(54) MOBILE PHONE USING TACTILE ICONS

(75) Inventors: Topi Kaaresoja, Helsinki (FI); Juha Hemanus, Helsinki (FI)

(73) Assignee: Nokia Corporation, Espoo (FI)

( * ) Notice: Subject to any disclaimer, the term of this patent is extended or adjusted under 35 U.S.C. 154(b) by 358 days.

(21) Appl. No.: 10/066,331

(22) Filed: Jan. 31, 2002

(65) Prior Publication Data

US 2002/0177471 A1    Nov. 28, 2002

Related U.S. Application Data

(60) Provisional application No. 60/292,989, filed on May 23, 2001.

(51) Int. Cl.$^7$ ............................ H04B 1/38; H04M 1/00; H04Q 7/20; H04Q 1/30; G08B 5/22
(52) U.S. Cl. ........................ 455/567; 455/466; 340/7.6
(58) Field of Search .................... 340/407.1, 407.2, 340/825.76, 7.6, 7.57, 7.62, 7.53; 379/52; 455/466, 412.1, 412.2, 418, 419, 414.1, 557, 455/556.1, 567

(56) References Cited

U.S. PATENT DOCUMENTS

| | | | |
|---|---|---|---|
| 5,575,761 A * | 11/1996 | Hajianpour | 601/48 |
| 5,719,561 A * | 2/1998 | Gonzales | 340/7.51 |
| 6,028,531 A * | 2/2000 | Wanderlich | 340/7.6 |
| 6,046,726 A * | 4/2000 | Keyson | 345/156 |
| 6,418,323 B1 * | 7/2002 | Bright et al. | 455/550.1 |
| 6,744,370 B1 * | 6/2004 | Sleichter et al. | 340/576 |
| 2001/0044328 A1 | 11/2001 | Tadashi | |
| 2004/0067780 A1 * | 4/2004 | Eiden | 455/567 |
| 2004/0176037 A1 * | 9/2004 | Vicendese | 455/66.1 |

FOREIGN PATENT DOCUMENTS

| | | |
|---|---|---|
| EP | 1 091 601 A2 | 11/2001 |
| EP | 1 195 979 A | 4/2002 |
| GB | 2 333 209 A | 7/1999 |
| JP | 09 156902 A | 6/1997 |

OTHER PUBLICATIONS

U.S. Appl. No. 09/717,862, filed Nov. 21, 2000, Ronkainen.
Peersman, G., Cvetkovic, S., Griffiths, P. and Spear, H., The Global System for Mobile Communications Short Message Service, IEEE Personal Communications, Jun. 2000, p. 15-23.
Global System for Mobile Communications, Digital Cellular Telecommunications System (Phase 2 +); Technical Realization of the Short Message Service (SMS), Point-to-Point (PP), (GSM 03.40), GSM Technical Specification, Jul. 1996, Section 9.2.3.

*Primary Examiner*—Nay Maung
*Assistant Examiner*—Raymond B. Persino
(74) *Attorney, Agent, or Firm*—Ware, Fressola, Van Der Sluys & Adolphson

(57) ABSTRACT

A mobile phone or telecommunications terminal that sends and receives tactile icons (tactile sensation patterns, including vibration patterns) discernible by feel to a user of the mobile phone or terminal, indicative of a message desired to be communicated between users of such a mobile phone or terminal (not information concerning the operation of the mobile phone or terminal). The mobile phone or terminal includes a source of tactile sensations (such as a vibratory device) that produces a tactile sensation in response to control signals issued by a controller when a message including a tactile icon is received; the control signals are based on instructions included in the mobile phone or terminal on how to interpret a tactile sensation pattern. The source of tactile sensations is for example an eccentric electric motor, a source of puffs of air, an electric signal, a razor-type linear vibrator, a solenoid, or a piezoelectric material.

20 Claims, 4 Drawing Sheets

* cited by examiner

MOBILE PHONE USING TACTILE ICONS

This application claims the benefit of provisional application 60/292,989 filed May 23, 2001.

FIELD OF THE INVENTION

The present invention relates to cellular telecommunications, and more particularly to mobile phones or other telecommunications terminals able to produce vibrations greater than 0 Hz or other tactile sensations discernible by the sense of touch or feel to users of such mobile phones or telecommunications terminals.

BACKGROUND OF THE INVENTION

With respect to human-machine interaction, mobile phones (using a wireless telephone network) are by their very nature a dramatic improvement over landline phones; a mobile phone obviously imposes fewer limitations on a user than a landline phone does, enabling more natural and expressive communication because the machine interface is almost not noticed. The mobile phone industry strives constantly to make using a mobile phone an even more natural and complete communication experience.

Therefore, many mobile phones today offer modes of expression not usually found in landline phones. For example, many mobile phones today include small video displays and offer communication via pictures (for example of cartoon-like drawings or logos) and associated text presented on the displays. Thus, the sense of sight is engaged by mobile phones. And of course mobile phones, like landline phones, also engage the sense of hearing.

NTT DoCoMo has an email service called Paldio Email. Panasonic has made phones (models 623p and 632p) that have a feature called BeatMelody (see http://www.mci.panasonic.co.jp/pcd/623 p/beatmelody/index.html, a Japanese language website), which apparently allows a user to attach simple vibration patterns to email. It is believed by the inventors that the Panasonic phones use the NTT DoCoMo Paldio email service to deliver the vibrations.

U.S. Pat. No. 6,028,531 (the '531 patent) to Wanderlich for Terminal Units for a Mobile Communication System introduces devices that can be used for sending and receiving different kinds of vibration patterns for interpersonal communication; see especially column 6, line 52 to column 7, line 44. The '531 patent also discloses various types of vibratable devices, including a personal vibrator of the type used on a human body with a user engaging portion that may comprise a smooth-ended rod, a smooth plug, or a vibratory aperture.

A patent application having Ser. No. 09/717,862, assigned to the present assignee, with a date of priority of Nov. 26, 1999, having Sami Ronkainen as the sole inventor, discloses tactile feedback, using vibration, as part of a phone user interface. The disclosure also introduces a new way of using a vibration motor included in mobile phones for alerting a user of the mobile phone to an incoming call or a message, such as a message conveyed by the so-called short message service (SMS).

As far as the inventors are aware, the vibrating Panasonic mobile phones have only a few different vibration patterns, which have no logical or associated meaning. The same is true of the vibrating mobile phones disclosed in the '531 patent. The vibrations there are mathematically generated by systematically varying amplitude, frequency and duration of vibration of a vibrator; in addition, the communication of such vibration patterns is done with paging systems, not with smarter (full) mobile communication systems such as mobile communication systems according to the Global System for Mobile Communications (GSM).

In Sami Ronkainen's invention, the vibrations have associated meanings, but the meanings are associated only with the user interface of the mobile phone. According to the invention disclosed there, a user can choose different vibration patterns for different callers, but there is no suggestion of sending vibration patterns as a means of communicating a message to the user of the receiving mobile phone.

What is therefore needed in mobile phones, besides a way to engage the senses of sight and hearing, as described above, is also a way to engage the sense of touch, not simply as it is engaged in holding a mobile phone, but as part of the communication experience, i.e. in communicating a message to the user of a receiving mobile phone.

SUMMARY OF THE INVENTION

Accordingly, in a first aspect of the invention, an apparatus is provided including: means for producing a tactile sensation for a user of the apparatus in response to a control signal; and a control means, responsive to a tactile sensation pattern signal and responsive to an instructions signal for instructing how to interpret a tactile sensation pattern, for providing the control signal; wherein the tactile sensation is expressive of information intended to be communicated to the user of the apparatus and exclusive of information indicating a call is waiting to be answered.

In accord with the first aspect of the invention, the apparatus may also include means for providing the instructions on how to interpret a tactile sensation pattern. Further, the apparatus may also include means for creating a tactile sensation pattern and at least temporarily storing the tactile sensation. Moreover, in some applications, the means for creating a tactile sensation may include: means for composing and editing a tactile sensation; a data store for storing a plurality of tactile sensation patterns; and means for selecting a tactile sensation pattern from the data store. Also in some applications, the means for creating a tactile sensation may include: means for downloading and editing a tactile sensation; a data store for storing a plurality of tactile sensation patterns; and means for selecting a tactile sensation pattern from the data store. Also further, the means for producing a tactile sensation is typically either: an eccentric electric motor, an intermittent source of air flow, an electric signal, a razor-type linear vibrator, a solenoid, a piezoelectric material, means for shaking a component of the apparatus, means for sliding back and forth a component of the apparatus, means for opening and closing a flip of the apparatus, or means for moving a sliding component back and forth. Also further, the means for producing a tactile sensation may be electrically coupled to the control means but may be physically attached to the user of the apparatus.

According to a second aspect of the invention, a wireless terminal is provided including an apparatus as in the first aspect of the invention.

According to a third aspect of the invention, a communication system is provided including a base station and also including a wireless terminal as in the second aspect of the invention.

According to a fourth aspect of the invention, a method if provided for use by a wireless terminal, including: a step, responsive to a tactile sensation pattern and responsive to instructions on how to interpret a tactile sensation pattern, of providing a control signal; and a step, responsive to the control signal, of producing a tactile sensation sensible to a user of the mobile phone; wherein the tactile sensation is expressive of information intended to be communicated to the user of the apparatus and exclusive of information indicating a call is waiting to be answered.

Thus, the inventors have taken the mobile phone ringing tones ("audible icons") and visual icons/smilies as two modes of message each packed in a compact, non-verbal, stylized way and extend the notion of compact, non-verbal, stylized message modes to include the tactile mode.

In contrast with the prior art, the invention enables the user of a mobile phone to determine the type of the vibration (i.e. the vibration pattern) to be communicated over the mobile phone. There is in principle no restriction on the type of vibration (or tactile icon) that can be communicated. A user can choose a tactile icon from a menu or create one on the fly. A description of the vibration pattern so determined can then be sent via a mobile communication system according to various paradigms, including SMS, ringing tones, and picture messages according to enhanced SMS or some other bearer service (such as multimedia message service) or protocol (such as wireless access protocol). The vibration pattern being communicated can have but is not limited to a logical meaning, or can be a rhythm, or be an imitation of the vibratory force that would be caused by a bouncing ball.

Users of mobile phones can then of course further enrich their communication experience by combining vibration patterns (tactile icons) with text (lexical icons), pictures (visual icons), animations (enhanced visual icons) or sounds (vibrations in the audible range, and as such, audible icons). These various icons/modes of messaging, when used in combination, have a synergistic effect enriching the communication experience.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

In providing a tactile message mode for a mobile phone, the inventors first used the original vibration motor in a mobile phone mock-up to create different kind of vibration patterns, each such pattern being identified as a tactile icon. The inventors performed a user study and discovered that such tactile icons (such as different vibration patterns, but also including other tactile sensations discernible by the sense of touch or feel) convey meanings and suggest associations for people and between people. The inventors determined that tactile icons can be sent and received as smart messages in much the same way as ringing tones and business cards are sent and received by mobile phones, and can also be sent as an attachment to a text message, a picture message, or any other multimedia message.

No additional hardware is needed to implement tactile icons even in existing mobile phones including an ordinary vibration motor. All that is needed is software to produce the tactile icons and to handle their messaging.

New Use of the Vibrating Element of an Ordinary Mobile Phone

An ordinary mobile phone is equipped with a component able to create vibrations, which are conducted to the user via the casing of the mobile phone (when the casing is in direct or indirect physical contact with the user). Typically the vibrating component is a small eccentric electric motor, i.e. an electric motor having a weight mounted on its axis where the center of the mass of the weight does not lie along the axis of the motor. The vibrating component can be any type of vibratable device, including for example a linear vibrator and a piezoelectric device.

According to the invention, such a vibration motor of an ordinary mobile phone is used to create different kinds of vibration patterns.

Figure 1:
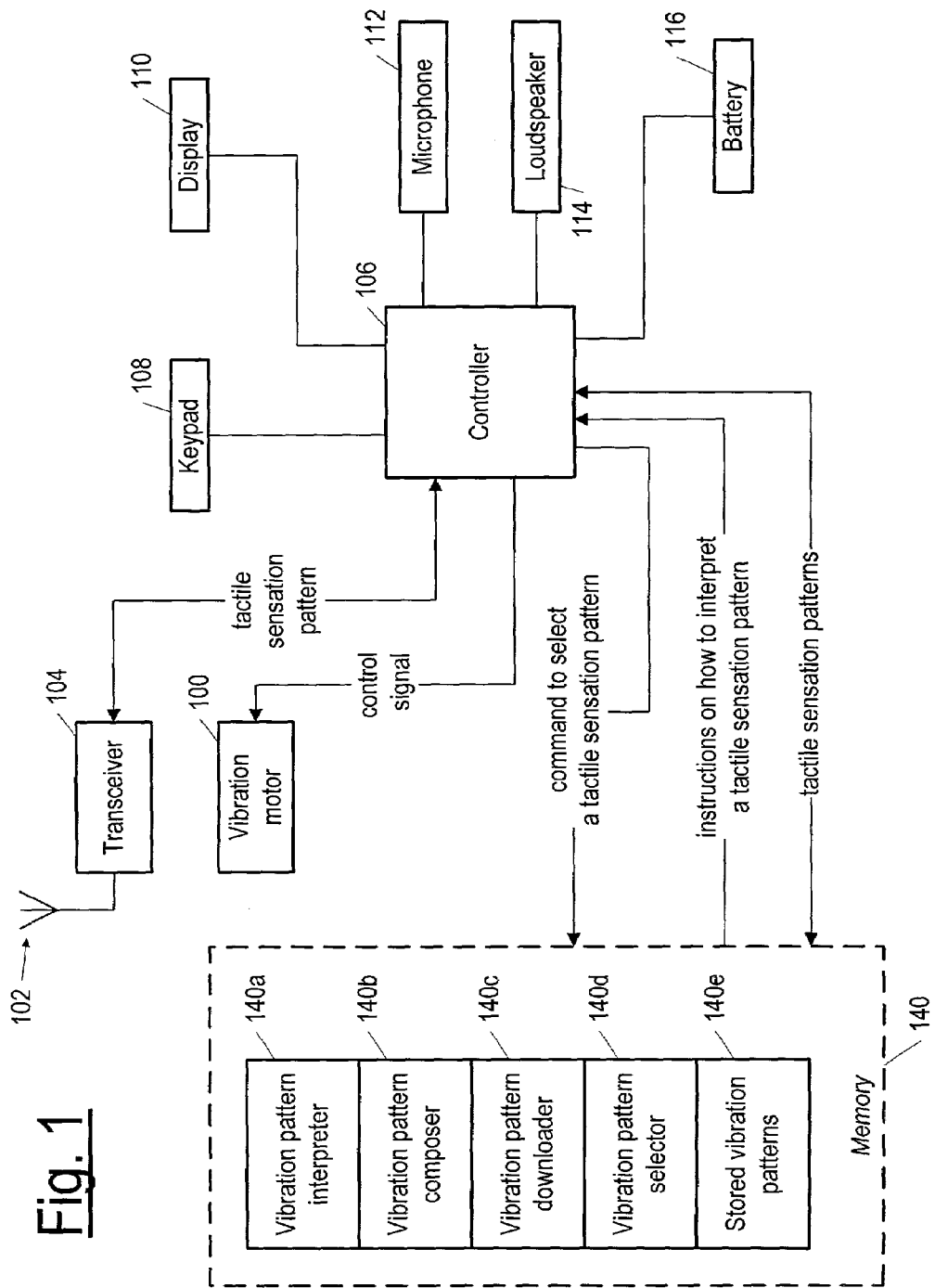
FIG. 1 is a block diagram of a mobile phone according to the invention.

Referring now to FIG. 1, an ordinary mobile phone includes a vibration motor 100 under the control of a microcontroller 106; the microcontroller controls the action of the vibration motor via a DC driver (not shown). The vibration motor produces a vibration, used in the prior art to give a silent alarm notifying the user of the mobile phone of an incoming call or a waiting message. Preferably, frequencies between 130 Hz and 250 Hz are used when producing vibration with a vibration motor.

According to the invention, such a microcontroller is programmed to cause the vibration motor to produce different kinds of vibration patterns (tactile icons), as determined by the user of the mobile phone using software specially developed for the task of composing tactile icons or selecting tactile icons from a menu. The program used by the microcontroller in causing the vibrations, i.e. the vibration pattern interpreter 140*a*, is held in non-volatile memory 140 in the mobile phone. The memory 140 also holds a vibration pattern composer program 140*b* by which a user interfaces with the mobile phone to create new tactile icons/vibrations patterns or edit existing tactile icons, stored vibration patterns 140*e* either created by the user (using the composer) or downloaded from a service providing tactile icons using another stored program, a vibration pattern downloader 140*c*, or saved from an already received message bearing tactile icons, and a vibration pattern selector program 140*c* enabling a user to select which stored tactile icon to communicate as a message using the mobile phone.

Still referring to FIG. 1, as indicated above, a mobile phone according to the invention need only have a vibration motor 100 or other means of producing a tactile sensation and software means (stored in the mobile phone in a memory 140) for executing vibration patterns (i.e. for interpreting the vibration patterns to the controller 106 by providing instructions to the controller so that the controller can command the vibration motor accordingly) and for managing vibration patterns (creating them, editing them, saving them or downloading them, and selecting one or another to communicate), as well as a data store of some sort or another for storing vibration patterns (in the memory 140). In addition, such a mobile phone usually also includes an antenna 102, a transceiver 104, and a battery 116 or an accumulator in place of a battery. Instead of either a battery or an accumulator, the mobile phone can use as a source of power a car battery or, when used in a house, external mains power for the house. In addition, the mobile phone usually includes a keypad 108, a display 110, a microphone 112, and a loudspeaker 114.

Figure 2:
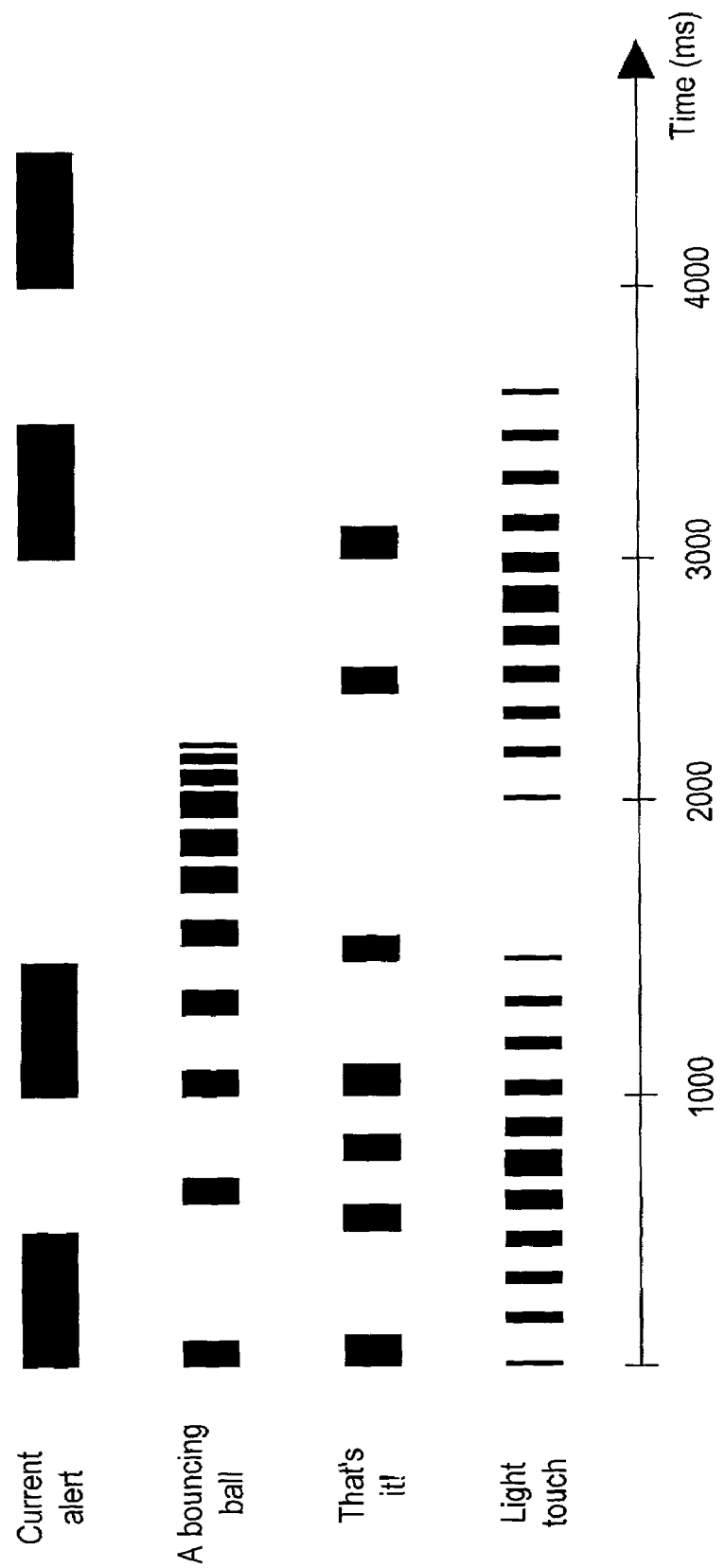
FIG. 2 is an illustration of a very few of many different possible vibration patterns (tactile icons) of use according to the invention.

Referring now to FIG. 2, various vibration patterns and their associated or logical meaning are illustrated. For each pattern, vibration (at some unspecified frequency greater than 0 Hz) as a function of time is indicated. In the case of imitating the vibratory force that would be caused by a bouncing ball as it bounces to a standstill, a lower frequency vibration would correspond to the bouncing of a larger, heavier ball, such as a basketball, and a higher frequency vibration would correspond to the bouncing of a smaller, lighter-weight ball, such as a ping pong ball or a golf ball. The vibration indicating an alert is usually generated using simple repeating cycles where the motor is on for about 500 ms and then off for about 500 ms in each cycle.

Vibration pulses of any length can be used for building tactile icons. As mentioned, only the duration of the on and off periods is indicated in FIG. 2, and other parameters, such as frequency and amplitude, could also be varied when specifying a vibration pattern/tactile icon. (Although a rotating vibration motor, strictly speaking, has a constant amplitude, the frequency of the vibration can be changed by changing the speed of rotation, and it turns out that the perceived intensity of vibration is proportional to the rotating speed so in that sense the intensity can be changed even for a rotating vibration motor.)

Figure 3:
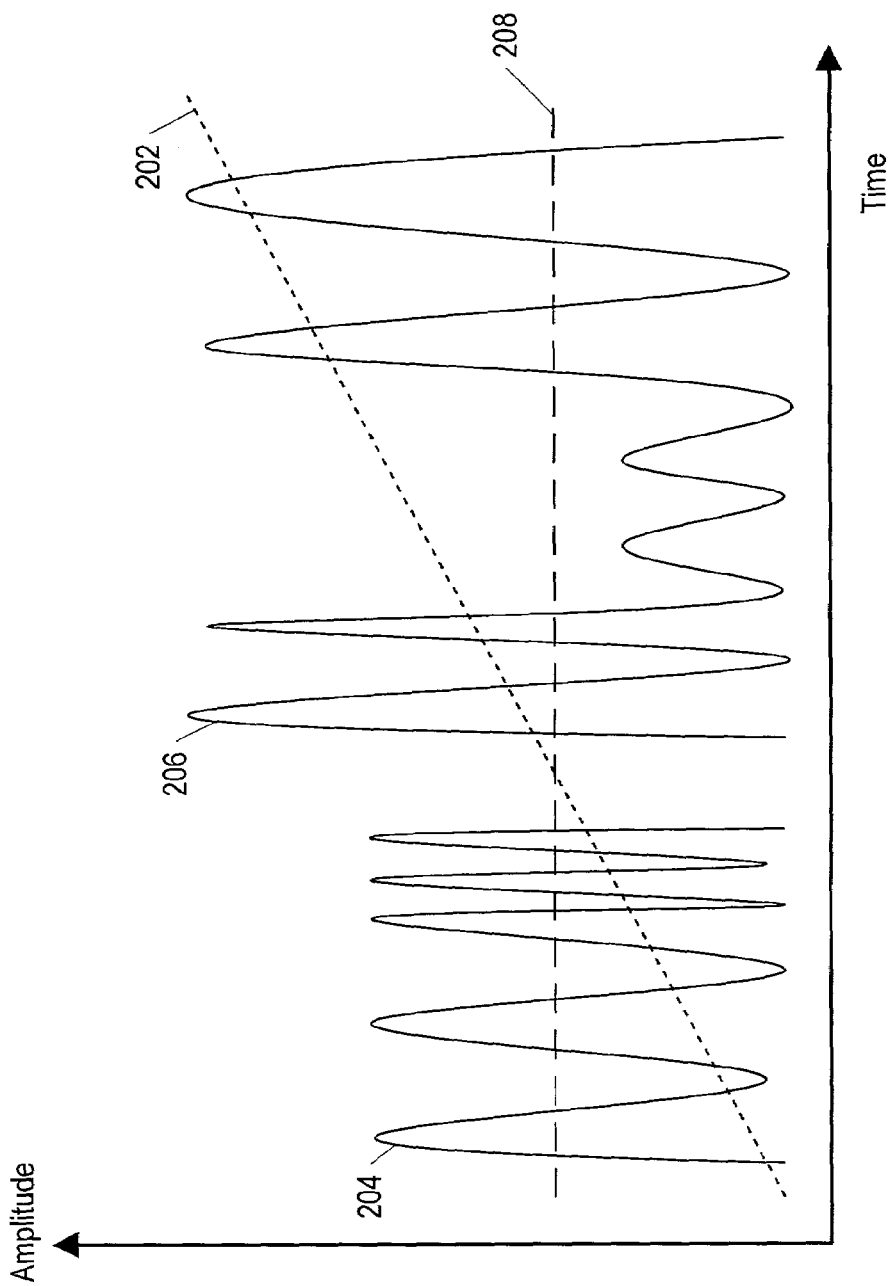
FIG. 3 is an illustration of different ways in which a vibration pattern of use according to the invention can vary.

Referring now to FIG. 3, the different ways vibration patterns may vary is indicated, using a coordinate system in which the x-axis represents time and the y-axis represents amplitude (a vibration-producing device capable of varying vibration in both amplitude and frequency being assumed for illustration). A dashed line 208 depicts a vibration pattern in which both the amplitude and frequency are constant, the vibration device being simply turned on and off over and over again at the desired frequency (at least for a period of time). A curve 204 depicts a vibration pattern in which the amplitude is constant but the frequency increases from a low frequency to a high frequency at the end of the pattern. A curve 206 depicts a vibration pattern in which both amplitude and frequency vary. Finally, a dashed line 202 depicts a pattern in which the amplitude increases, but the frequency remains constant, in this case the frequency being the rate at which the vibration device is turned on and off.

Figure 4:
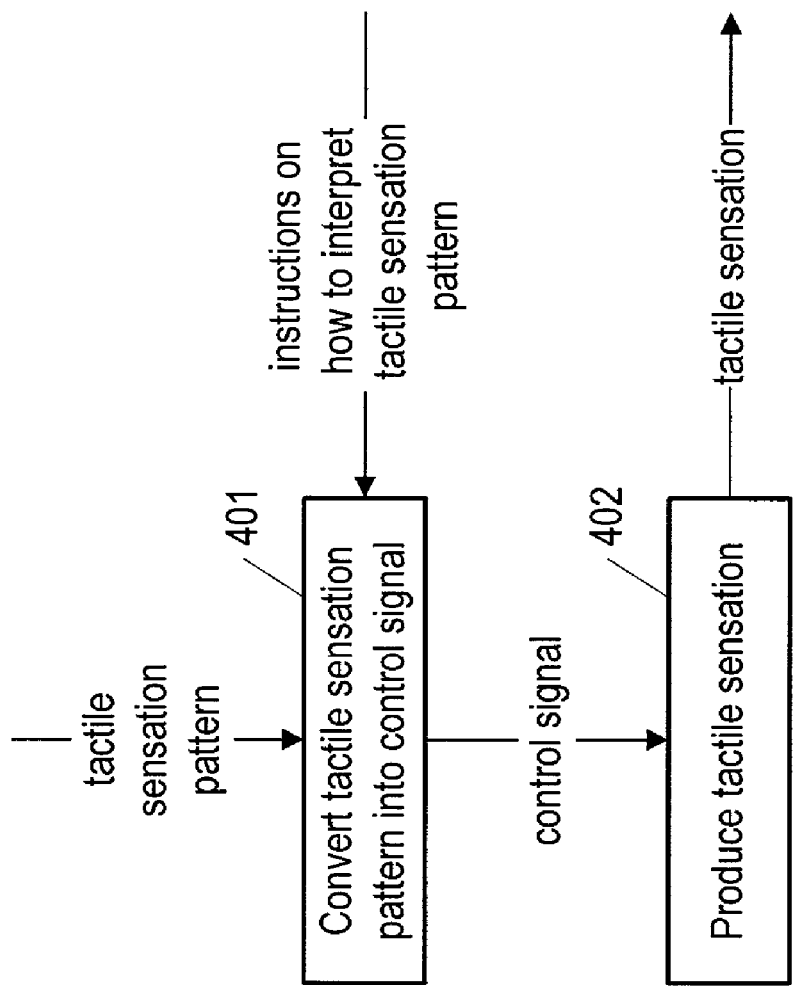
FIG. 4 is a flowchart of the invention.

Referring now to FIG. 4, a flowchart of the invention is shown as a method for use by a mobile phone including a first step 401 in which, in response to a tactile sensation pattern (which could either have been received by the mobile phone or which could have been indicated by an indicator or pointer in a message received by the mobile phone, and indicator or pointer that indicates a predetermined tactile sensation pattern known to the mobile phone), and using instructions on how to interpret the tactile sensation pattern, the mobile phone converts the tactile sensation pattern into a control signal, and then, in a second step 402, based on the control signal, the mobile phone produces a tactile sensation.

How Tactile Icons are Communicated

According to the preferred embodiment, tactile icons are communicated between mobile phones (or between a mobile phone and a landline phone) as smart messages, in much the same way as ringing tones and business cards are communicated today. (Ringing tones are today often downloaded by mobile phone users from a web service to personalize the ringing tones of their mobile phones.) In other embodiments, tactile icons are communicated as an attachment to a text message, a picture message, or some other multimedia message.

In the preferred embodiment, what is communicated as a tactile icon is an on/off pattern, such as indicated in FIG. 2, at some specified frequency (and possibly indicating a variation in amplitude during the pattern). In some embodiments, however, a tactile icon selector is all that is communicated, and the receiving mobile terminal creates the vibration pattern predetermined to correspond to the communicated selector.

Of course the source or the receiver of a tactile icon may, according to the invention, be a device other than a mobile phone, and may be other than a phone at all. For example, a tactile icon can be sent with a PC and be received with a vibrating mouse.

The mobile phones can, but need not be, equipped with editor software to compose vibration patterns. With a composer one could create personal tactile icons quickly and send them to his or her closest friends.

Different tactile icons can, but need not be, provided through mobile network based services. For example, tactile icons could be downloaded from a web service, just as ringing tones and logos are downloaded today.

Tactile icons could also be communicated as a game or as an aspect of a game. For example, an operator could send a rhythm pattern (non-audible) to a customer (who has registered for receiving games) and the task would be to guess the song behind the rhythm.

How Tactile Icons are Converted to Actual Vibrations Sensible to Users of Mobile Phones As already mentioned, a tactile icon can be translated into actual vibration (at any frequency greater than 0 Hz) using an eccentric weight mounted on the axis of a motor 100 under the control of a microcontroller 106 (FIG. 1). Of course a tactile icon actuator can also be implemented as other kinds of devices, including for example a solenoid or a piezoelectric actuator. In the case of a piezoelectric actuator, not only the frequency of the vibration but also its amplitude could be varied.

The vibration motor or other means for producing vibration can be located either in the mobile phone as a separate component (as indicated in FIG. 1), or in the battery 116, or as a separate component attachable to the mobile phone, or as a separate component or part of a component coupled only electrically to the mobile phone (to receive commands from the microcontroller 106) but physically attached to the user of the mobile phone so as to communicate vibration patterns to the user, such as a vibratable device (for example, a piezoelectric disk) included in a wristband to be worn by a user and connected electrically to the controller 106.

The invention is also intended to comprehend other tactile sensations besides those created by actual mechanical vibrations, such as tactile sensations caused by puffs of air or tactile sensations caused by a small electric current (what is called electro-tactile stimulation, using two electrical contact areas on the skin of the user receiving the tactile sensation). As already mentioned, low frequency vibrations can also be produced by artificially shaking some inside parts of a mobile phone such as the battery, or by moving a component of a mobile phone, including for example opening and closing a flip or by sliding back and forth a component that slides.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. An apparatus included in a communications terminal, comprising:
   means for receiving a tactile sensation pattern signal from another communications terminal independent of any existing or attempted voice connection;
   a control means, responsive to the tactile sensation pattern signal, for providing a control signal; and
   means for producing a tactile sensation in response to the control signal;
   wherein the tactile sensation pattern signal comprises respective instructions for producing each disturbance in a pattern of disturbances, each disturbance sensible as a tactile sensation, the pattern of disturbances suggesting by itself associations or meanings independent of any existing or attempted voice connection and so directly communicating to any user of the apparatus the associations or meanings independent of any existing or attempted voice connection.

2. An apparatus as in claim 1, wherein the tactile sensation pattern signal is communicated independent of a voice telephone call.

3. An apparatus as in claim 1, wherein the tactile sensation pattern signal is communicated as at least part of a message according to a short or multimedia message service.

4. A communication terminal including an apparatus as in claim 1.

5. A communication system including a base station and also including a communication terminal as in claim 4.

6. An apparatus as in claim 1, wherein the control means (106) is further responsive to an instructions signal for instructing how to interpret a tactile sensation pattern signal, and the apparatus further comprises means (140a) for providing the instructions on how to interpret a tactile sensation pattern signal.

7. An apparatus as in claim 6, further comprising means (140b 140c 140d 140e) for creating a tactile sensation pattern corresponding to the tactile sensation pattern signal and at least temporarily storing the tactile sensation pattern.

8. An apparatus as in claim 7, wherein the means (140b 140c 140d 140e) for creating a tactile sensation pattern includes:
   a) means (140b) for composing and editing a tactile sensation pattern;
   b) a data store (140e) for storing a plurality of tactile sensation patterns; and
   c) means (140d) for selecting a tactile sensation pattern from the data store.

9. An apparatus as in claim 7, wherein the means (140b 140c 140d 140e) for creating a tactile sensation pattern includes:
   a) means (140c) for downloading and editing a tactile sensation pattern;
   b) a data store (140e) for storing a plurality of tactile sensation patterns; and
   c) means (140d) for selecting a tactile sensation pattern from the data store.

10. An apparatus as in claim 7, wherein the means (100) for producing a tactile sensation is selected from the group comprising: an eccentric electric motor, an intermittent source of air flow, an electric signal, a razor-type linear vibrator, a solenoid, a piezoelectric material, means for shaking a component of the apparatus, means for sliding back and forth a component of the apparatus, means for opening and closing a flip of the apparatus, and means for moving a sliding component back and forth.

11. An apparatus as in claim 7, wherein the means for producing a tactile sensation is electrically coupled to the control means but is physically attached to the user of the apparatus.

12. A method for use by a communication terminal, comprising:
   a step of receiving a tactile sensation pattern signal from another communication terminal independent of any existing or attempted voice connection;
   a control step, responsive to the tactile sensation pattern signal, for providing a control signal; and
   a step of producing a tactile sensation in response to the control signal;
   wherein the tactile sensation pattern signal comprises respective instructions for producing each disturbance in a pattern of disturbances, each disturbance sensible as a tactile sensation, the pattern of disturbances suggesting by itself associations or meanings independent of an existing or attempted voice connection and so directly communicating to any user of the apparatus the associations or meanings independent of any existing or attempted voice connection.

13. A method as in claim 12, wherein the step responsive to a tactile sensation is further responsive to instructions on how to interpret a tactile sensation pattern.

14. A method as in claim 12, wherein the tactile sensation pattern signal is communicated independent of a voice telephone call.

15. A method as in claim 12, wherein the tactile sensation pattern signal communicates an associated meaning or communicates a logical meaning or communicates a rhythm or communicates an imitation of a vibratory force.

16. A method as in claim 12, further comprising:
   a step of downloading and editing a tactile sensation pattern to provide the tactile sensation pattern; and
   a step of storing the tactile sensation pattern in the data store of tactile sensation patterns.

17. A method as in claim 12, wherein the tactile sensation pattern signal is communicated as at least part of a data message according to a short or multimedia message service.

18. A method as in claim 17, wherein the tactile sensation pattern signal is a tactile icon communicated as at least part of a short message according to a short or multimedia message service.

19. A method, comprising:
   a step in which a communication terminal receives from a user an indication of a tactile sensation pattern in a data store of tactile sensation patterns hosted by the communication terminal, wherein the tactile sensation pattern comprises a pattern of disturbances each representing a tactile sensation, the pattern of disturbances having an association or meaning the user would like to communicate to a user of another communication terminal;
   a step in which the communication terminal receives from the user of the communication terminal an indication of the user of the other communication terminal or an indication of the other communication terminal; and
   a step in which the communication terminal provides a tactile sensation pattern signal corresponding to the tactile sensation pattern and communicates the tactile sensation pattern signal to the other communication terminal independent of any existing or attempted voice connection to the other communication terminal;

wherein the tactile sensation pattern signal comprises respective instructions for producing each disturbance in the tactile sensation pattern of disturbances.

20. A method as in claim 19, further comprising:
a step of downloading and editing a tactile sensation pattern to provide the tactile sensation pattern; and a step of storing the tactile sensation pattern in the data store of tactile sensation patterns.

* * * * *